United States Patent Office 3,555,692
Patented Jan. 19, 1971

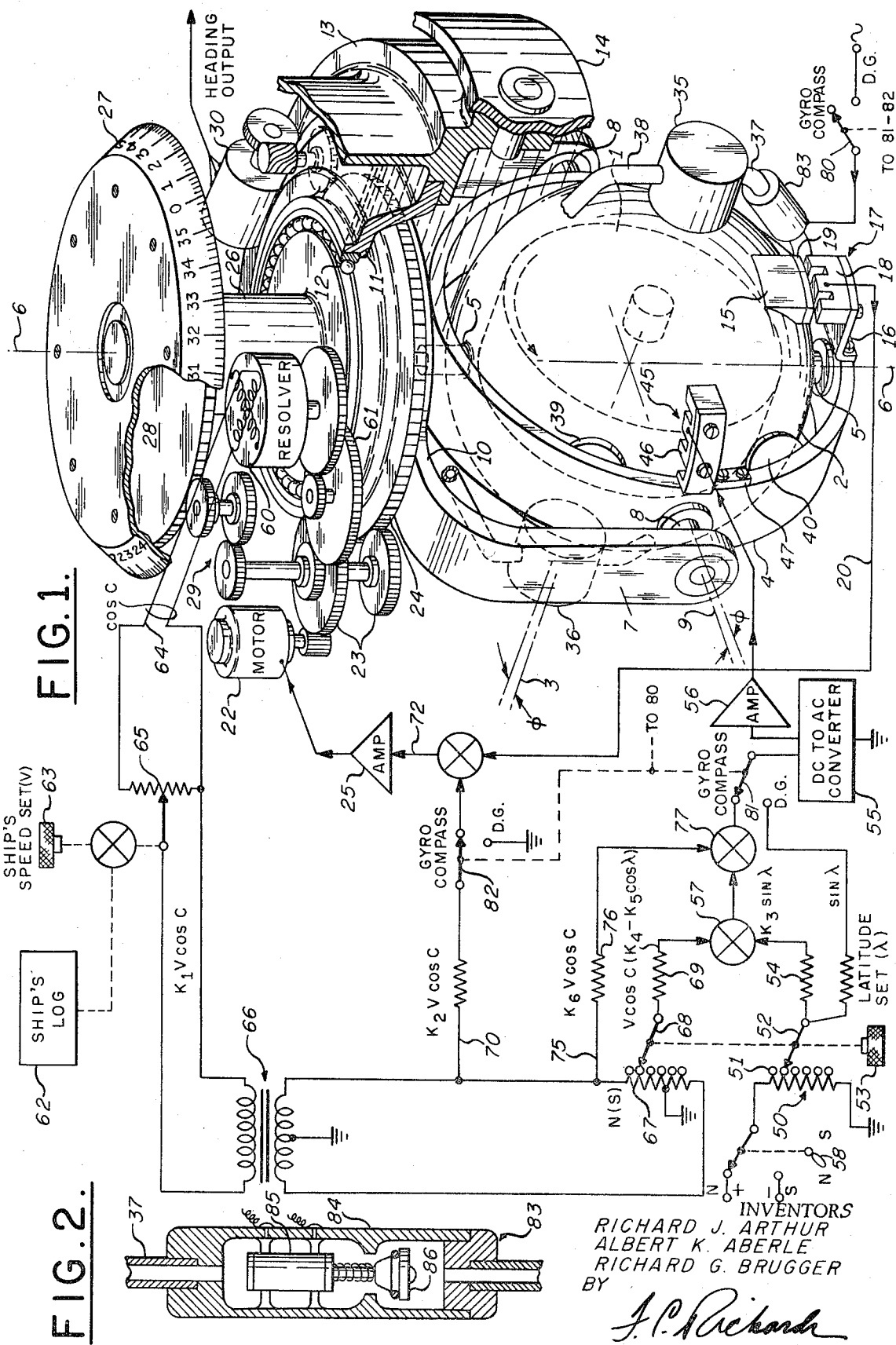

3,555,692
SPEED, LATITUDE AND ACCELERATION COMPENSATION OF A BALLISTIC GYROCOMPASS
Albert K. Aberle, Ednam Forest, and Richard J. Arthur, Charlottesville, Va., and Richard G. Brugger, Hempstead, N.Y., assignors to Sperry Rand Corporation, a corporation of Delaware
Filed June 7, 1968, Ser. No. 735,443
Int. Cl. G01c 19/38
U.S. Cl. 33—226                              10 Claims

ABSTRACT OF THE DISCLOSURE

A gyrocompass of the type having mechanical ballistic and damping means of fixed parameters wherein electrical compensating controls are applied in such a manner that the steady-state settled azimuthal speed error is made to be identical with the ballistic deflection error regardless of latitude whereby to eliminate oscillatory resettling after speed and/or course changes, the configuration also providing automatic acceleration compensation by modifying the "fixed" latitude compensation.

BACKGROUND OF THE INVENTION

The present invention relates to gyrocompass apparatus primarily for use on maneuverable marine and land vehicles. In general, there are two types of gyrocompasses—those which are substantially entirely mechanically controlled and those which are substantially entirely electrically controlled. In a mechanically controlled gyrocompass the meridian seeking and damping controls are generally purely of a mechanical nature. A typical mechanically controlled compass is illustrated in U.S. Pat. No. 3,452,443 entitled "Gyrocompasses," invented by R. J. Arthur, issued July 1, 1969 and assigned to the assignee of the present invention. As disclosed in this application, the meridian seeking torque is derived from a liquid ballistic which may be of the type shown in U.S. Pat. No. 2,990,623 entitled "Self-Clearing Liquid Ballistic for Gyro Assembly," invented by W. R. Keyser, Jr. and issued July 4, 1961; while damping of the gyrocompass is provided by a mass fixed to the West side of the sensitive element. Thus, in such a mechanically controlled gyrocompass the ballistic and damping means have fixed parameters, that is, the characteristics are not varied in any way during normal operation of the compass.

In an electronically controlled gyrocompass, such as those disclosed in U.S. Pat. 2,729,107 entitled "Gyroscopic Instrument," invented by F. D. Braddon and issued Jan. 3, 1956, or U.S. Pat. No. 3,212,196, entitled "Gyrocompasses," invented by L. F. Carter and issued Oct. 19, 1965, the ballistic and damping torques are derived from, for example, an electrical liquid level or pendulum carried by the sensitive element from which signals are generated, modified where required, and applied to electric torque motors operative to apply proper meridian seeking and damping torques to the sensitive element of the gyroompass.

The present invention is directed to the simple mechanical gyrocompass of the type having fixed parameter ballistic and damping means but wherein various compensating torques required for compass accuracy are applied electrically, thereby avoiding complex mechanical mechanisms which would otherwise be necessary. In such a gyrocompass certain errors are developed due to the motion of the vehicle on which the compass is mounted relative to the earth and its location on the earth; the most important of which are errors varable with changes in latitude, speed and course of the vehicle. Also, in such a compass having mechanical ballistics and a damping mass, acceleration errors are also developed.

In a conventional mechanically controlled compass, the normal speed error is allowed to develop and the compass card lubber line and/or the stator housing of the compass transmitters are corrected by an offset corresponding to the speed error. Whenever the vehicle on which such a simple mechanically controlled compass is carried changes its speed and/or course, the ballistics respond in such a manner as to produce a ballistic deflection error and such error will be equivalent to the northerly speed error only if the compass is Schuler tuned. Therefore, in a mechanically controlled compass having fixed ballistic and damping parameters, the period will vary with latitude and it follows that there are only two latitudes (one for north latitudes and one for south latitudes) at which the Schuler period is obtained, the fixed parameters normally being designed for the mean latitude at which the vehicle is to operate. For all other latitudes, therefore, the compass will always be required to resettle after any change in speed and/or course because the speed error and the ballistic deflection error are not equal. Such resettling by compass design, may require a long period of time during which the compass reading is inaccurate. Such characteristic is clearly limiting and undesirable whenever the vehicle is required to operate over wide ranges of latitude and where frequent changes in speed and/or course are requred such as maneuvering in congested harbors, etc.

SUMMARY OF THE INVENTION

It is therefore the primary object of the present invention to provide a simple mechanically controlled gyrocompass which is coerced in such a manner that the steady-state settled azimuth speed error is identical to the azimuth ballistic deflection error regardless of latitude thereby eliminating the necessity for the gyro to resettle after changes in speed and/or course.

Basically, the foregoing is accomplished by applying a northerly speed correcting torque about the vertical axis of the gyro sensitive element and by simultaneously offsetting the east-west horizontal axis of the compass follow-up gimbal relative to the gyro spin axis (i.e. modifying their orthogonality) by an amount equal but opposite to the gyro ballistc deflection angle. Thus the follow-up gimbal supporting the sensitive element is oriented to true north and true compass card reading and true transmitted compass data are available therefrom. Gyrocompasses of the type having a damping mass on the west (or east depending on the type of ballistic) side of the sensitive element are also subject to northerly acceleration errors and in the gyrocompass of the present invention such acceleration errors are also automatically compensated.

BRIEF DESCRIPTION OF THE DRAWINGS

A preferred embodiment of a gyrocompass embodying the foregoing inventive concept will now be described with reference to the accompanying drawings wherein:

FIG. 1 includes a mechanical schematic of the gyrocompass together with a schematic diagram of the electrical circuits required for controlling the gyrocompass in accordance with the concepts of the present invention;

FIG. 2 is an illustration of a suitable ballistic cut-off valve which may be incorporated in the gyroscope in one of its modes of operation.

DESCRIPTION OF THE PREFERRED EMBODIMENT

The gyrocompass illustrated in the preferred embodiment of the present invention is a mechanically controlled gyrocompass of the so-called inverse gimbal type, such as that shown in U.S. Pat. No. 1,923,885 entitled "Gyroscopic Compass" invented by A. L. Rawlings and issued Aug. 22, 1933 or U.S. Pat. No. 2,692,441 entitled "Damper for Gyrocompasses" invented by L. F. Carter and issued Oct. 26, 1954; or the above referenced U.S. Pat. No. 3,452,433.

Referring now to FIG. 1, the gyrocompass of the present invention comprises a gyro rotor 1 which is journalled in a spherically shaped rotor case 2 in suitable rotor bearings (not shown) for spinning about a spin axis 3 which in normal operation is substantially aligned with the earth's meridian, i.e. substantially north-south. The constructional details of the rotor and rotor case which may be termed the gyrosphere, are clearly illustrated in U.S. Pat. No. 2,886,897 entitled "Zenith Meridian Indicator" invented by L. F. Beech and issued Aug. 28, 1953. The rotor case 2 is pivotally supported in a vertical gimbal 4 by means of trunnions 5 and suitable low friction bearings for rotation about a nominally vertical axis 6. Vertical gimbal 4 in turn is supported between the arms of a fork-shaped gimbal or yoke 7 by means of trunnions 8 and suitable low friction bearings for rotation about a horizontal normally substantially east-west axis 9. The yoke 7 has a large diameter generally bell-shaped upper plate 10 which is journalled in a corresponding bell-shaped support plate 11 by means of a large main bearing 12 for rotation about a normally vertical axis 6. Plate 11 is suitably secured in a compass binnacle 13 shown fragmentarily for clarity of illustration and it will be understood that it comprises the main enclosure for the gyrocompass.

Thus, the azimuth yoke or fork 7 lies in the normal E–W plane and along the nominal horizontal axis 9 of the vertical ring 4 while the vertical ring 4 holds the sensitive element or gyrosphere 2 in the nominally vertical axis 6. Furthermore, it will be understood that the entire binnacle 13 may be filled with a flotation fluid (schematically illustrated by means of short horizontal lines in the figure) whereby to unload the support bearings for the gyrosphere 2 and vertical ring 4.

Yoke 7, which constitutes the reference member for the gyrocompass, is slaved to the sensitive element or gyrosphere 2 by means of a closed-loop position follow-up servo system. The signal pick-off for this system comprises a conventional E-type pick-off 17, the stator 18 of which is suitably mounted on a bracket 16 secured to the vertical gimbal 4 and the armature of which constitutes a soft iron pad 19 secured to the gyrosphere 2 by means of block 15. The pick-off 17 is located so as to detect relative angular movement between gyrosphere 2 and gimbal 4 about the trunnion 5, such relative movement generating in the pick-off core output winding an alternating electrical signal having a phase and amplitude proportional to the direction and magnitude of this movement, this output appearing on lead 20. The pick-off 17 may be of the type shown in the above U.S. Pat. No. 2,886,897. Mounted on fixed support plate 11 is the servomotor 22 of the compass follow-up loop. It is coupled through suitable reduction gearing 23 with a large ring gear 24 secured to the top plate 10 of the yoke 7. The servomotor 22 is energized by the output of follow-up amplifier 25 the input of which is connected to receive the signal from pick-off 17 and hence drives the yoke 7 in a manner to reduce the pick-off signal to zero whereby, absent the present invention as will be explained, to align the yoke 7 into orthogonal relation with gyro spin axis 3. A pedestal-like extension 26 is secured to the top plate 10 of the yoke and a compass card 27 and card gear 28 are journalled thereon for rotation about vertical axis 6, the compass card providing a visual indication of the geographic heading of the vehicle. Suitable reverse gearing 29 connects servomotor 22 with compass card gear 28 such that compass card 27 is driven in a one-to-one ratio with azimuth gear 24 in a direction opposite to the direction of rotation of yoke 7. The purpose of this is to provide the helmsman viewing the compass card from the rear of the binnacle as in the above design application, with proper sensing when changes in course are desired.

A compass transmitter 30 is mounted on support plate 11 of binnacle 13 and geared with a one-to-one ratio with yoke 7 whereby to provide compass information to remote repeaters or other equipment such as an autopilot. Of course, a "fine" synchro may be added for increased accuracy.

The overall configuration of the compass and binnacle as thus far described may be similar to that disclosed in the above mentioned patent application. Furthermore, it will be understood that the entire binnacle 13 is pendulously journalled in a suitable roll and pitch isolation gimbal 14 as shown schematically in FIG. 1 but in more detail in U.S. Pat. No. D. 214,200 entitled "Console Marine Gyrocompass" invented by R. J. Arthur issued May 20, 1969, and assigned to the assignee of the present invention.

In the gyroscope of the present invention, the mechanical means for imparting meridian seeking torques to the gyrosphere 2 comprises a conventional liquid ballistic including a pair of tanks 35 and 36 partially filled with a suitable fluid, such as silicone, and connected together by means of a lower tube 37 which allows flow of fluid from one tank to the other. A breather tube 38, shown broken away in FIG. 1 for clarity, connects the upper portions of the tanks. The liquid ballistics function in a conventional manner to detect tilt of the gyrosphere and to apply a torque about the horizontal axis 9 to precess the gyrosphere toward the meridian. Damping of the compass is accomplished by providing a mass on the west end of the gyrosphere. In the present embodiment the mass constitutes a plurality of weights, such as weights 39 and 40, their effective mass being arranged to be concentrated on the west end of the gyrosphere. A number of other weights may be employed on the gyrosphere as required to adjust the overall buoyancy of the gyrosphere in the supporting fluid. Thus, the parameters of the liquid ballistics and damping mass are fixed by design to provide the desired ballistic moment $M_B$ and damping moment $M_D$ relative to the angular momentum H of the gyro rotor 1.

Being a mechanically controlled gyrocompass having fixed ballistic and damping parameters, the vertical earth rate acting on the gyro is compensated by a horizontal torque developed in the ballistics which requires a small fixed tilt of the spin axis 3 about the horizontal E–W axis 9, the magnitude of which is proportional to the sine of the local latitude. Inasmuch as compass damping is accomplished by means of the fixed weights 39, 40 on the west side of the gyrosphere 2, which itself can rotate in the vertical gimbal 4 about vertical axis 6, any tilt about the horizontal east-west axis 9 (ballistic tilt) will introduce a torque about vertical axis 6 which will therefore result in an azimuthal error. This error is termed the "latitude damping" error and is compensated by applying a torque $T_L$ about the compass vertical axis 6 of a magnitude determined by the relation $$T_L = \frac{M_D}{M_B} H \omega_e \sin \lambda \tag{1}$$

$\omega_e$ is earth's rate and $\lambda$ is the local latitude. The compensation provided by this torque will be referred to herein as the "fixed latitude compensation."

In the preferred embodiment of the present invention the means for providing a torque about the vertical axis 6 of the gyrocompass comprises an eddy current torquer 45 which may be of the type shown in U.S. Pat. No. 2,270,876, entitled "Alternating Current Coercing Means for Gyroscopes," invented by Esval et al. and issued Jan. 27, 1942, which includes a wound stator 46 mounted on a suitable bracket 47 secured to the vertical ring 4 so that the stator 46 lies closely adjacent the surface of gyrosphere 2, against which the E-torquer operates. Torquer 45 is similar in construction to the pick-off 17. Energization of the control winding produces a torque on the gyrosphere 2 about the vertical axis 6 dependent upon the direction and magnitude of the energizing voltage.

The fixed latitude compensation is provided by circuitry at the lower left hand area of FIG. 1. A voltage proportional to $K_3 \sin \lambda$ is provided by means of a tapped potentiometer 50 having its tapped winding 51 excited from a source of DC voltage with a plus or minus selector switch 58 for north or south latitudes respectively and its wiper 52 set by means of a suitable knob 53 calibrated in accordance with the local latitude. The resistances between the taps are set to provide the sine function output. Resistance 54 together with the magnitude of the potentiometer excitation voltage provides the proportionality factor $K_3$ which, in accordance with Equation 1 above, includes the constant terms $$\frac{M_D}{M_B} H \omega_e$$

This voltage is combined in summing circuit 57 with a voltage proportional to $V \cos C(K_4 - K_5 \cos \lambda)$ which will be described below. The resultant voltage is combined in summing circuit 77 with a voltage proportional to $K_6 V \cos C$ which will also be explained below. The output voltage from summing circuit 77 is converted to AC by means of a DC to AC converter 55 and applied to the input of torquer amplifier 56 the output of which is supplied to the control windings of torquer 45. The foregoing circuit therefore provides the fixed latitude compensation for the gyrocompass of the present invention.

As discussed above, the gyrocompass of the present invention, being one having fixed parameter ballistic and damping factors, is subject to errors associated with changes in speed and/or course of the vehicle in which it is carried. In many conventional gyrocompasses of this type, the speed error is allowed to develop and the compass output is corrected, for example, by offsetting the compass card lubber line and the transmitter stator if a remote indication is desired. However, as stated above, with such arrangement the compass setting point is equivalent to the ballistic deflection at only two specific (one north and one south) latitudes and hence except at these latitudes the compass is required to resettle after every change in speed and/or course. In accordance with the teachings of the present invention the compass is coerced in such a manner that its steady-state settled speed error is identical with the ballistic deflection error regardless of latitude. The apparatus for accomplishing this together with its mathematical basis is set forth below.

The ballistic moment $M_B$ provided by the liquid in the tanks 35 and 36 is, by design, acceleration sensitive and will apply a torque $T_a$ about the horizontal E-W axis 9 in proportion to the N-S component of the applied acceleration whenever the vehicle changes course or speed, viz $$T_a = M_B \frac{a \cos C}{g} \quad (2)$$

where $a$ is the acceleration, C is the course of the vehicle and $g$ is the acceleration due to gravity constant. This torque results in a precession rate about vertical axis 6 of a magnitude $$\frac{T_a}{H} = \omega_\phi = \frac{M_B}{H_g} a \cos C \quad (3)$$

and if the acceleration continues for a time, $t$, an azimuth offset $\phi$ of the spin axis will result, the magnitude of which will be $$\phi = \omega_\phi t = \frac{M_B (a \cos C) t}{H_g} = \frac{M_B}{Hg} V \cos C \quad (4)$$

since $at = V$. This is the ballistic deflection error and is a function only of northerly speed and is therefore constant for each specific speed regardless of the latitude of the vehicle.

If the vehicle is moving over the surface of the earth in a northerly direction with a velocity, V, the north pointing gyrosphere 2 senses an equivalent angular rate about the horizontal E-W axis of $$\omega_s = \frac{V \cos C}{R} \quad (5)$$

where R is the earth's radius, and the north pointing end of its spin axis will tilt upwardly at the same rate. This tilt rate could be compensated for by applying a torque about the vertical axis 6 of the gyrosphere 2 of such a direction and magnitude that the gyro spin axis would be precessed in the opposite direction at the same rate whereby the gyro would be rendered insensitive to angular tilt associated with latitude changes and there would be no northerly speed error.

Now let us suppose a vehicle starting from rest (although in practice it may merely change its velocity from some previous velocity and the following analysis will hold) and travelling with a northerly velocity of $V \cos C$. The tilt rate associated with the change of latitude is $\omega_s$ and the ballistic deflection is $\phi$ (relations 5 and 4 above). However, since the spin axis 3 is laterally offset from the meridian by the azimuthal ballistic deflection $\phi$, the gyrosphere 2 will experience a further tilt rate about the horizontal E-W axis due to the horizontal component of earth's rate, the magnitude of which is $$\omega_{\phi h} = \omega_e \cos \lambda \sin \phi \quad (6)$$

However, since $\phi$ is a small angle, Equation 6 and Equation 4 may be combined to produce $$\omega_{\phi h} = \omega_e \cos \lambda \frac{M_B}{H_g} V \cos C \quad (7)$$

Thus, the horizontal tilt rates which the gyro now senses are those expressed in Equations 5 and 7 and since they are inherently of opposite sense, result in a total horizontal tilt rate of $$\omega_h = \left(\frac{V}{R} \cos C\right) - \left(\omega_e \cos \lambda \frac{M_B}{H_g} V \cos C\right) \quad (8)$$

or, simplifying $$\omega_h = V \cos C \left(\frac{1}{R} - \omega_e \cos \lambda \frac{M_B}{H_g}\right) \quad (9)$$

which rate results from a torque equivalent to $$T = H \omega_h = V \cos C \left(\frac{H}{R} - \omega_e \cos \lambda \frac{M_B}{g}\right) \quad (10)$$

Now by applying a compensating torque of this magnitude and proper sense about the vertical trunnions 5 of the gyrosphere 2, the steady-state settle error will be equivalent to the ballistic deflection error and therefore the gyro spin axis 3 will run offset from the meridian by the ballistic deflection angle regardless of latitude.

In the illustrated embodiment of the present invention the foregoing teaching is implemented by the circuitry illustrated in the left hand portion of FIG. 1. However, for these purposes a resolver 60 is mounted on the upper mounting plate 11 of the compass binnacle and is geared through suitable reduction gearing 61 to rotate at 1:1 speed with the azimuth gear 24 (and hence with the compass card 28). Also provision is made for a source of ship's speed data which may be provided either automatically through the ship's log 62 or manually by ship's speed set (V) knob 63.

Resolver 60 is excited with a suitable fixed voltage whereby the output from the cosine winding thereof is proportional to $\cos C$ across leads 54 which voltage is applied across a potentiometer 65 positioned in accordance with a function of vehicle speed V. The output $K_1 V \cos C$ is applied across the primary winding of coupling transformer 66, the grounded center-tapped output winding of which provides the excitation for a resistance network employed to produce the required signals which results in the compensating torques and compass offset to be described.

The northerly speed signal appearing at the secondary of transformer 66 is applied across the tapped switched resistance network 67, the wiper 68 of which is positioned by the latitude set knob 53. The taps on the resistor network are selected to provide a cosine function output whereby the signal $V \cos C$ is attenuated in accordance with the factor $(K_4 - K_5 \cos \lambda)$. The taps are also arranged to provide zero output at 40° latitude since in this embodiment the compass is Schuler tuned at this latitude. The circuit constants are designed to include the various fixed parameters set forth in the foregoing equations $$\left(K_4 = \frac{H}{R} \text{ and } K_5 = \omega_e \frac{M_B}{g}\right)$$

and are herein represented by the resistance network 67 and resistance 69. The output of resistor network 67 is applied to the input of vertical axis torquer amplifier 56, the output of which is applied to vertical axis torquer 45 to thereby provide a torque about gyrosphere trunnion 5—5 in accordance with Equation 10 above to thereby compensate the gyro for northerly speed error. This compensating signal is combined with the "fixed" latitude correction torque derived in circuit 51–54 as described above through summing circuit 57.

The northerly speed signal appearing at the output of transformer 66 is applied as a bias signal with the proper proportionality constant as set forth in Equation 4 above $(K_2 = M_B / H_g)$ to the compass follow-up servo loop 17–22 to thereby offset the reference member or yoke 7 of the system in accordance with the ballistic deflection to thereby make the compass card 27 and the transmitted data from transmitter 30 read true meridian north relative to the binnacle 13. This is accomplished by combining the northerly speed signal on lead 70 with the compass follow-up signal on lead 20 and applying the resultant signal on lead 72 to follow-up amplifier 25, the output of which is supplied to follow-up motor 22. In this manner, the follow-up gimbal 7 and hence vertical ring 4 will be required to be offset from the gyrosphere to thereby generate a signal in pick-off 17 which is equal to the speed signal on lead 70 under steady-state conditions. Thus, the gyro spin axis will be allowed to settle offset from the meridian while the follow-up member or yoke 7 will be accurately maintained on the meridian (actually at right angles to the meridian or true east-west). In other words, since the foregoing compensations render the gyrocompass insensitive to the torques represented by Equations 5 and 6, it will remain settled at all times.

In accordance with the teachings of the present invention, the foregoing electronic techniques for effectively rendering the gyro compass insensitive to speed and/or course changes may be further augmented by a torque proportional to northerly speed and thereby the compass will in addition be automatically compensated for acceleration effects.

With the controls applied to the compass as hereinabove set forth, the compass steady-state settled offset will be equal to the ballistic deflection and except for the damping weight 39–40 being subject to northerly acceleration, there would be no oscillating resettling at the completion of the acceleration. However, it will be remembered that the fork or yoke 7 horizontal E–W axis 9 is offset from the gyro spin axis by the amount as set forth in Equation 4 above, vis, $$\phi = \frac{M_B}{H_g} V \cos C$$

Since the weight 30–40 is now offset from the E–W axis, the damping moment $M_D$ produces a torque about this axis and, for a northerly speed (as shown in the drawings) effectively makes the south end of the gyrosphere 2 heavy by the amount $$T_{h_D} = M_D \sin \phi \qquad (11)$$

and since $\phi$ is a small angle $$T_{h_D} = M_D \phi \text{ or } \frac{M_D M_B}{H_g} V \cos C \qquad (12)$$

Therefore, to counter this and thus maintain the local vertical earth rate compensation, the gyrosphere 2 must tilt through such an angle, $\Delta \psi$, that the ballistic fluid displacement torque is equal to this change in horizontal torque, i.e., the north end of the gyrosphere must tilt down. The magnitude of this counter torque is $$T_c = \Delta \psi M_B \qquad (13)$$

and since $T_c = T_{h_D}$ $$\Delta \psi M_B = \frac{M_D M_B}{H_g} V \cos C \qquad (14)$$

and $$\Delta \psi = \frac{M_D}{H_g} V \cos C \qquad (15)$$

Now, consider the effects of a northerly acceleration on the weight 39–40. The tilt angle produced by the acceleration acting for a time $t$ is $$\Delta \psi = \frac{M_D}{H_g} at \cos C \qquad (16)$$

and therefore $$\Delta \psi = \frac{M_D}{H_g} V \cos C \qquad (17)$$

The foregoing demonstrates that the title angle required to compensate for the horizontal unbalance due to servo offset for ballistic deflection error is automatically and instantly produced on the gyrosphere 2 by the acceleration force. Now consider, for explanation purposes, that the vehicle is at rest at a given latitude and is accelerated to some finite speed over a time $t$. The "fixed" latitude compensation is already set in by knob 53. At the end of the acceleration, the tilt angle due to the acceleration is changed by the amount set forth in Equation 17.

However, the normal latitude compensation has been made for a tilt angle different from that now existing and therefore this magnitude of the latitude compensating torque must be modified by a torque equivalent to $$M_D \left(\frac{M_D}{H_g} V \cos C\right) \text{ or } \frac{M_D^2}{H_g} V \cos C \qquad (18)$$

Thus, from the foregoing it is seen that if a further torque is applied about the vertical axis of the compass proportional to the value set forth in Equation 18, the gyrocompass will be completely compensated for the effects of acceleration acting thereon during changes in velocity and/or course of the vehicle.

Referring again to FIG. 1, the foregoing is accomplished by providing a further signal proportional to $V \cos C$ from the secondary of transformer 66 on lead 75 and attenuating this signal in accordance with the proportionality factor $$K_6 = \frac{M_D^2}{H_g}$$

as by means of suitable resistance 76, this signal being applied through summing network 77 in the vertical axis torquer circuit which signal modifies the "fixed" latitude compensation signal obtained from the potentiometer 50.

The gyrocompass of the present invention may include means for converting the instrument from a gyrocompass to a conventional directional gyro for use particularly at high latitudes to provide a stabilized directional indication. The DG mode may be initially selected by means of a mode selector switch which comprises ganged switches 80, 81 and 82. Switch 80 serves to energize a ballistic cut-off valve 83 which is shown in more detail in FIG. 2. The valve comprises an enlarged elongated cylinder 84 connected directly in the tube 37 within which is axially mounted a solenoid 85 operating a suitable valve 86. When switch 80 is closed, solenoid valve 85 is energized, closing valve 86 to thereby prevent flow of fluid between the tanks 35 and 36. Switch 81 is moved to its lower position to provide a suitably calibrated voltage to torquer 45 proportional to the sine of the latitude to thereby maintain the proper earth's rate correction to the gyro. Since the gyro is now not operating as a gyrocompass, switch 82 is moved to its lower position to cut-out the servo offset voltage allowing the compass follow-up loop to accurately align fork 7 with the spin axis of the gyrosphere 2. Leveling in the DG mode is automatically provided by the damping weights 39–40.

From the foregoing specification, it is evident that we have provided a simple mechanically controlled gyrocompass which is coerced in such a manner that the steady-state settled azimuth error is made identical with the azimuth ballistic deflection regardless of latitude wherein by a servo offset technique acceleration errors are also compensated and correction to the compass card and data transmitters is simultaneously provided. Thus, while the gyrocompass of the present invention will respond to any changes in speed and/or course and to accelerations, the controls and offset technique described herein make the compass card and data transmitters provide true azimuthal course information at all times thus rendering it very suitable for use on highly maneuverable vehicles.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A gyrocompass instrument for maneuverable vehicles having a sensitive element and mechanical, fixed parameter ballistic control means for imparting meridian seeking torques to said sensitive element, a reference member supporting said sensitive element in a binnacle for providing a compass indication and follow-up means between said sensitive element and reference member for slaving said reference member to said sensitive element, the combination comprising
    (a) means for compensating said gyrocompass for the latitude error,
    (b) mean supplying first and second electrical signals proportional to the N–S component of vehicle speed,
    (c) means responsive to said first signal for applying a torque to said sensitive element of a magnitude and sense to coerce said compass to settle with a speed error substantially corresponding to its ballistic deflection error, and
    (d) means responsive to said second signal for biasing said follow-up means in a magnitude and sense equal to the ballistic deflection angle whereby the output data of said compass is always true and unaffected by said changes in speed and/or course of said vehicle.

2. The gyrocompass as set forth in claim 1 wherein said mechanical ballistic control means comprises a liquid ballistic.

3. The gyrocompass as set forth in claim 1 wherein said sensitive element includes a weight having its effective mass located on the west side thereof whereby to impart a leveling torque on said sensitive element whereby to damp the compass.

4. The gyrocompass instrument as set forth in claim 3 wherein said damping mass produces a horizontal axis torque on said sensitive element proportional to said follow-up offset, and wherein said mass responds to N–S acceleration in a sense to oppose said torque whereby said compass is automatically compensated for acceleration error, and wherein said combination further includes means for providing a third signal proportional to the N–S component of vehicle speed, and means responsive to said third signal for modifying said lattitude error compensating means in accordance therewith whereby to compensate for the change in speed associated with said acceleration.

5. The gyrocompass as set forth in claim 1 wherein said first signal includes a component proportional to the cosine of craft latitude whereby to compensate for the effect of horizontal earth's rate produced by said ballistic deflection.

6. A mechanically controlled, electrically compensated gyrocompass apparatus comprising
    (a) a sensitive element including a rotor case and a rotor journalled therein for spinning about a substantially N–S axis, a vertical gimbal in which said rotor case is journalled for rotation about a nominally vertical axis, a yoke in which said gimbal is journalled for rotation about a substantially E–W axis, and binnacle means in which said yoke is journalled for rotation about a normally vertical axis,
    (b) mechanical, fixed parameter ballistic and damping means mounted on said rotor case for imparting meridian seeking and damping torques to said sensitive element whereby said compass is subject to speed and ballistic deflection errors resulting from changes in speed and/or course, and electrical follow-up means coupled between said sensitive element and said yoke for orienting said yoke in said binnacle in accordance with said sensitive element,
    (c) electrical means including torquing means coupled between said rotor case and said gimbal for applying a torque about said gimbal vertical axis proportional to craft northerly speed whereby to coerce said spin axis to settle substantially at an angle corresponding to the ballistic deflection angle for that speed, and
    (d) further electrical means for biasing said follow-up means in accordance with craft northerly speed whereby to offset said yoke relative to said gyro spin axis through an angle corresponding to said ballistic deflection angle whereby the orientation of said yoke relative to said binnacle corresponds to true meridian course.

7. A gyrocompass for maneuverable vehicles of the type having fixed parameter mechanical ballistic means for producing meridian seeking torques on said gyrocompass whereby said gyrocompass is subject to horizontal and vertical tilt rates produced by northerly speed and ballistic deflection, and a compass follow-up means for driving a reference member in accordance with the orientation of said compass, the combination comprising
    (a) means for providing a first signal proportional to the northerly speed of the vehicle,
    (b) means responsive to said first signal and to the cosine of the latitude for applying a torque on said gyrocompass in a sense to oppose said vertical tilt rate and to an amount such as to coerce said compass to settle at the ballistic deflection corresponding to said northly speed,
    (c) means for producing a second signal proportional to the northerly speed of said vehicle, and
    (d) means responsive to said second signal for biasing said compass follow-up means through an angle corresponding to said ballistic deflection whereby the compass reference means provides an output proportional to the true meridian course.

8. The gyrocompass as set forth in claim 7 wherein said fixed ballistic and damping parameters have predetermined values such that said compass is Schuler tuned at a predetermined latitude and wherein the means responsive to said cosine of the latitude provides zero output at said predetermined latitude.

9. The gyrocompass as set forth in claim 7 wherein the proportionality factor of said first signal includes a term corresponding to the earth's radius and wherein the proportionality factor of the second signal includes a term corresponding to the ballistic moment of said ballistic means and the angular momentum of the gyrocompass rotor.

10. The apparatus as set forth in claim 9 wherein said first signal includes components proportional to the horizontal component of earth's rate and the ballistic deflection angle.

References Cited

UNITED STATES PATENTS

| | | |
|---|---|---|
| 1,923,885 | 8/1933 | Rawlings. |
| 2,270,876 | 1/1942 | Esval et al. |
| 2,302,894 | 11/1942 | Ross. |
| 2,677,194 | 5/1954 | Bishop. |
| 2,692,441 | 10/1954 | Carter. |
| 2,729,107 | 1/1956 | Braddon. |
| 2,810,291 | 10/1957 | Bishop et al. |
| 2,886,897 | 5/1959 | Beach. |
| 2,990,623 | 7/1961 | Keyser. |
| 3,212,196 | 10/1965 | Carter. |
| 3,452,443 | 7/1969 | Arthur. |

OTHER REFERENCES

German printed application 1,272,003, July 1968, Boysen (C. Plath Fabrik).

ROBERT B. HULL, Primary Examiner